SINGLE DOMAIN WALL PROPAGATION IN MAGNETIC SHEETS

Filed Oct. 12, 1967 2 Sheets-Sheet 1

INVENTORS A. H. BOBECK
E. DELLA TORRE
A. A. THIELE
BY Herbert M. Shapiro
ATTORNEY United States Patent Office 3,513,452

Patented May 19, 1970

3,513,452

SINGLE DOMAIN WALL PROPAGATION IN MAGNETIC SHEETS

Andrew H. Bobeck, Chatham, Edward Della Torre, Plainfield, and Alfred A. Thiele, East Orange, N.J., assignors to Bell Telephone Laboratories, Incorporated, Murray Hill and Berkeley Heights, N.J., a corporation of New York Filed Oct. 12, 1967, Ser. No. 674,835
Int. Cl. G11c *11/14, 19/00*
U.S. Cl. 340—174 14 Claims

ABSTRACT OF THE DISCLOSURE

Artificial impedances to domain motion are provided in a sheet of magnetic material in which single wall domains are moved. The impedances are arranged to define two-position locations within which each domain in the sheet can be moved. An impedance between the two positions of each location for each domain permits memory operation on a threshold basis.

FIELD OF THE INVENTION

This invention relates to magnetic memories comprising sheets of magnetic material in which single wall, reverse-magnetized domains can be propagated in response to offset magnetic fields.

BACKGROUND OF THE INVENTION

Copending application Ser. No. 579,931, filed Sept. 16, 1966, for A. H. Bobeck, U. F. Gianola, R. C. Sherwood, and W. Shockley (now Pat. 3,460,116), discloses a two-dimensional shift register in which single wall domains are moved controllably. The rare earth orthoferrites are representative of a large number of materials useful to this end.

Copending application Ser. No. 579,904, filed Sept. 16, 1966 for A. H. Bobeck discloses a memory arrangement wherein single wall domains are moved from first to second information indicative positions in corresponding bit locations in a magnetic sheet. Such a memory employs two intermediate positions at each bit location and all partially selected bit locations have domains which are moved to these intermediate positions during a select operation. The operation requires a sequence of pulses in contrast to a threshold operation which permits selection of a particular bit location by a field in excess of a threshold value and fails to select locations which are subjected to fields less than the threshold value during a select operation. Operation on a threshold basis is simpler and, accordingly, is preferred so long as suitable margins can be obtained.

Accordingly, an object of this invention is to provide a domain propagation memory operable on a threshold basis.

SUMMARY OF THE INVENTION

The invention is based on the realization that an impedance to domain propagation can be created artificially in a sheet of material in which domains can be propagated. Consequently, a domain propagation memory having a first and a second position for a single wall domain in each bit location also advantageously includes an artificial impedance to domain propagation between those two positions. Memory operation on a threshold basis results. If, further, the two positions at each bit location are encompassed by a second impedance to domain motion, interactions between domains in neighboring bit locations are essentially eliminated.

The impedance to domain motion may be achieved in a variety of ways. In one embodiment, a glass layer is apertured and the apertures are filled with magnetic material. The apertures are arranged to form a prescribed, illustratively, FIG. 8 or constricted annulus-shaped pattern. The apertures are filled with magnetic material which is magnetized to provide what may be thought of as a constricted annular field, of a polarity to repel single wall domains. The apertures are arranged in a contiguous sheet to encompass associated bit locations. The aperture pattern then forms a prescribed pattern of fields defining, via each loop of that pattern, a position for a single wall domain. Single wall domains are moved in each bit location between the first and second positions so defined. The two apertures forming the constriction in the annulus provide the impedance between positions.

First and second sets of X and Y propagation conductors are arranged to intersect between the two positions in associated bit locations. Pulses of a first polarity on selected X and Y conductors propagate the corresponding domain to a first position in only a selected bit location. Pulses of the opposite polarity return the domain to the corresponding second position.

DETAILED DESCRIPTION

Figure 1:
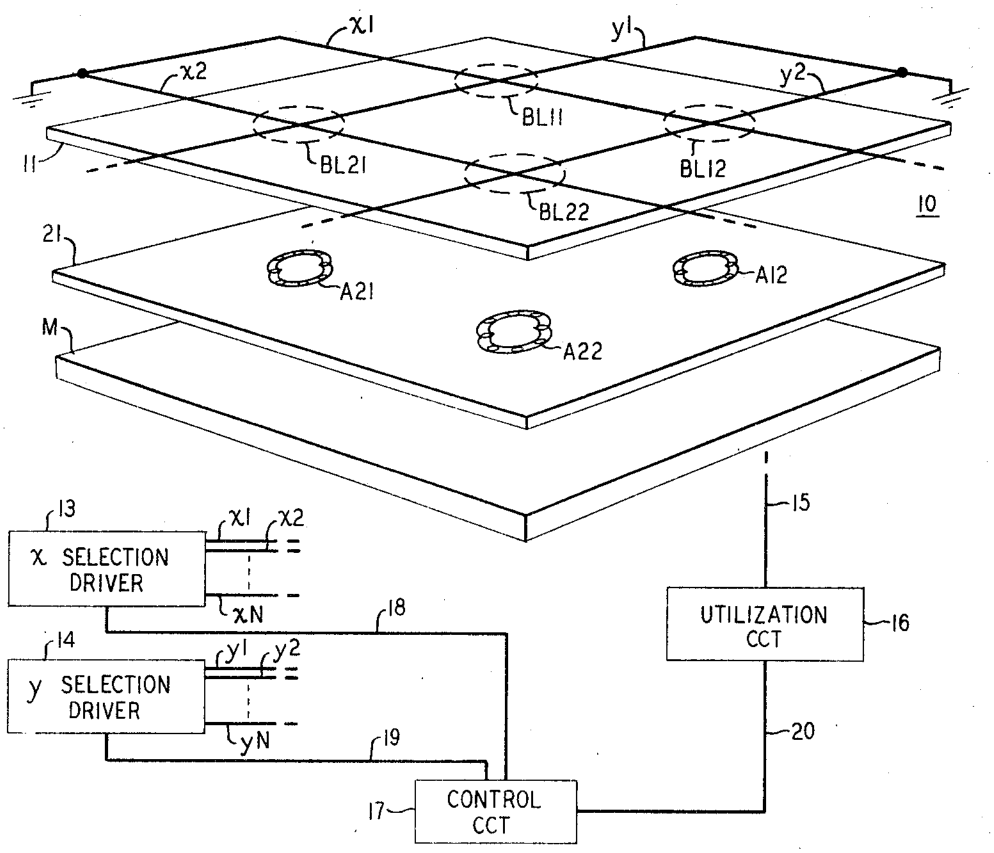
FIG. 1 is a schematic representation of a memory arrangement in accordance with this invention.

FIG. 1 shows a memory arrangement 10 in accordance with this invention. The arrangement includes a sheet 11 illustratively of a rare earth orthoferrite in which single wall domains are moved in response to offset magnetic propagation fields.

The arrangement is organized such that coincident X and Y pulses cause a domain in only a selected bit location in sheet 11 to move while domains in partially selected bit locations are only negligibly disturbed.

In order to illustrate this operation, four representative bit locations are shown in sheet 11. Those bit locations are identified by imaginary broken circles located at the intersections of representative X and Y drive conductors. The drive conductors are designated, in the customary fashion, X1, X2, Y1 and Y2. The bit locations are designated BL11, BL12, BL21, and BL22, the numerals in each designation identifying the corresponding X and Y conductors. The X and Y conductors are connected between X and Y selection drivers 13 and 14, respectively, and ground, and may be positioned on opposite faces of sheet 11 or on the same face if properly insulated.

A sense conductor 15 couples each bit location and is connected between a utilization circuit 16 and ground. The manner of coupling between conductor 15 and a bit location is discussed further in connection with the description of a representative bit location hereinafter.

Drivers 13 and 14 and circuit 16 are connected to a control circuit 17 by conductors 18, 19, and 20, respectively. The various drivers and circuits may be any such elements capable of operating in accordance with this invention.

The arrangement 10 of FIG. 1 includes, illustratively, a glass sheet 21 contiguous sheet 11. Sheet 21 is apertured, by any well known means, such as by laser cutting, to provide an illustrative figure 8 arrangement of apertures corresponding in position to the bit locations in sheet 11. The annular regions defined by the apertures are designated A11, A12, A21, and A22 also to correspond to the bit locations in sheet 11. These annular regions are imaginary, serving only to show the pattern of apertures in this instance.

Figure 2A:
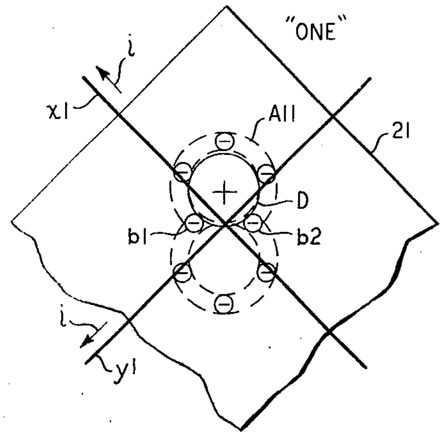
FIGS. 2A, 2B, 3 and 5 are schematic representations of portions of the arrangement of FIG. 1.
Figure 2B:
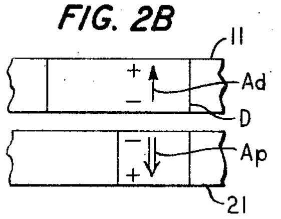

The apertures are filled with magnetic material, such as ferric oxide, magnetized in a direction opposite to that of the single wall domain. Let us adopt the convention that sheet 11 is saturated downward as viewed in FIG. 1. This direction we may designate the negative direction of magnetization. A single wall domain then is an isolated region where flux is directed upward. This direction we may designate the positive direction and a single wall domain D, accordingly, may be represented by an encircled plus sign as shown in FIGS. 2A and 2B. An annular region in sheet 21 therefore provides, illustratively, a distribution of "permanent" negative fields as represented by the negative signs shown for the apertures of annulus A11 in FIG. 2A. This field, it is to be remembered, is superimposed, illustratively, on a bias magnetic field, generated conveniently by magnet M in FIG. 1 for which a return flux path (not shown) is provided. The magnet M provides a field of a polarity to collapse single wall domains and serves to maintain the domain in a stable geometry as disclosed for the optimized operation in this mode in copending application Ser. No. 664,524, filed Aug. 30, 1967, for A. A. Thiele.

The fields generated by the negatively poled material, in the apertures of the constricted annulus, repel a single wall domain. This is clear from FIG. 2B which shows an imaginary cross section of sheets 11 and 21 of FIG. 1. Single wall domain D is represented in FIG. 2B as an arrow A*d* directed upward as viewed. In accordance with the adopted convention, the arrow is directed from negative to positive as indicated by the minus and plus signs in sheet 11 in the figure. The magnetization of the magnetic material in an aperture of sheet 21 is represented by the downward directed double arrow A*p* which also is dircted from negative to positive. It is clear from the figure that the negative signs face one another indicating a force of repulsion. Consequently, a negative sign, in any figure hereinafter which shows a top view of sheet 11, indicates a force of repulsion for domains and a positive sign, a reversal of the magnetization in sheet 21, indicates a force of attraction for domains in sheet 11.

A domain such as representative domain D in FIG. 2A permanently occupies one of two positions in a bit location. The two positions for a domain are shown in FIGS. 2A and 3 and may be taken as the "one" and the "zero" positions, respectively, representing a binary one and a binary zero as will become clear.

The apertures in sheet 11 which form the annulus A11 are spaced apart, illustratively, distances less than the diameter of a single wall domain. Consequently, the movement of a domain from a first to a second position in a selected location is resisted by the repulsion forces between the magnetically negative "apertures" of the annulus and the magnetically positive single wall domain. A similar result is realized even if the apertures are not so closely spaced.

Figure 3:
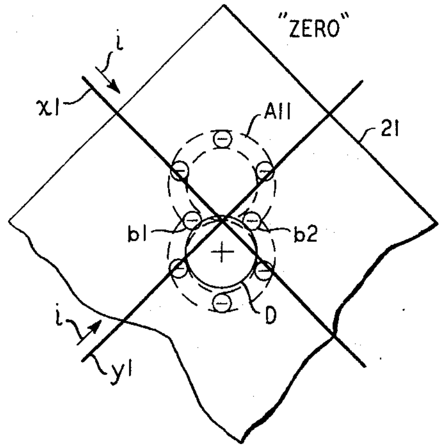

The repulsion force encountered when a domain is moved from the position occupied in FIG. 2A to that occupied in FIG. 3 is exerted by the fields provided by the flux in the material of apertures *b*1 and *b*2 on domain D. This force, then, constitutes a threshold which any propagation field must overcome in so moving a domain D. The force, however, is determined by the magnetization of the material in each aperture and, accordingly, is a controllable function of the material employed and the quantity used.

The operation requires the storage of a single wall domain permanently in each bit location of the memory, say in the position shown in FIG. 2A. The provision and disposition of domains to this end are entirely consistent with the teachings of copending application Ser. No. 629,-993, filed Apr. 11, 1967, for R. C. Le Craw, R. C. Sherwood and R. Wolfe, and of the above noted copending application of Bobeck et al. and are not discussed further herein.

For operation on a threshold basis, a current is applied to each of conductors X1 and Y1 such that the field generated by each current is alone insufficient to overcome the repulsion force provided by the magnetically negative "apertures" *b*1 and *b*2. Both together can overcome that force, however. Consequently, domain D in representative bit location BL11 moves from the position occupied in FIG. 2A to that occupied in FIG. 3 whereas the domains in bit locations BL12 and BL21 are only negligibly disturbed when those current are applied. The familiar right-hand rule demonstrates that current as described in connection with FIG. 2A generate, in sheet 11 below the intersection of conductors X1 and Y1 in that figure, fields which attract domain D. Only in a selected bit location is such a field generated by the current flowing in each selected conductor. Consequently, a field so generated in the selected location attracts a domain with sufficient force to overcome the threshold provided by the magnetic material of the associated apertures *b*1 and *b*2. In the partially selected locations, only half such a force, i.e. that associated with the current in only one selected conductor, is generated. Such a force is insufficient to so overcome the threshold.

Figure 4:
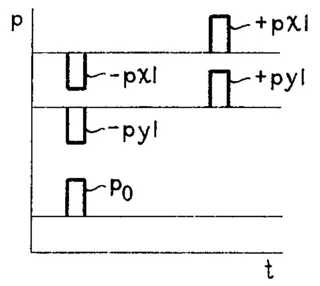
FIG. 4 is a pulse diagram of the operation of the memory of FIG. 1.

The currents applied to conductors X1 and Y1 for moving domain D in FIG. 2A to the zero position shown in FIG. 3 are directed upward and to the left and downward and to the left for conductors X1 and Y1 respectively as indicated by the arrows designed *i* in FIG. 3. Currents in the directions shown are designated "negative" as indicated by the pulses —PX1 and —PY1 in the pulse diagram of FIG. 4. "Positive" currents, in directions indicated by the arrows *i* in FIG. 3, cause a domain to move from the zero to the one position. Such pulses are designated +PX1 and +PY1 in FIG. 4. If a selected bit location already includes a domain in the position to which a domain is urged by the propagation fields only negligible domain motion results.

We have now demonstrated that a single wall domain can be moved between first and second positions of a selected bit location in a domain propagation memory on a threshold basis.

A variety of sensing means are suitable. If optical readout is preferred, both the Kerr and Faraday effects may be utilized to this end. If electrical readout is preferred, wiring techniques similar to those employed in conventional random access arrangements may be used.

Figure 5:
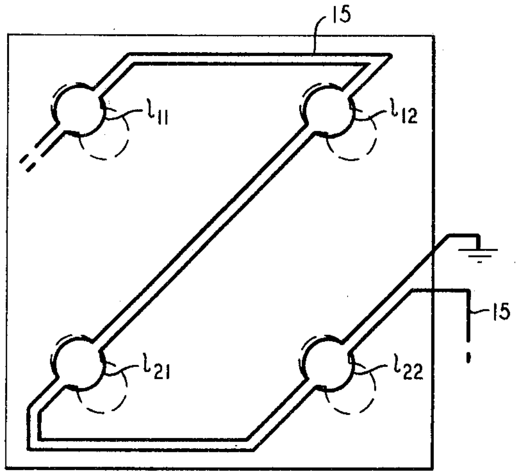

An illustrative readout mode is now described in connection with FIG. 5. Specifically, conductor 15 of FIG. 1 is coupled to the one portion of each bit location in sheet 11. The conductor conveniently includes a return path to ground with corresponding portions of which it forms a conductor loop encompassing the coupled positions. The loops are designated lab where *a* and *b* are numerals corresponding to the bit locations coupled. The sense of next adjacent couplings conveniently may alternate, in accordance with well known noise reduction techniques.

A readout operation is carried out in response to negative pulses on conductors corresponding to a selected location. Thus, for example, concurrent pulses PX1 and PY1 on conductors X1 and Y1 cause a domain D in FIG. 2A to move to the zero position of FIG. 3 inducing a voltage in conductor 15 for detection by utilization circuit 16 under the control of control circuit 17. The output pulse provided, when the selected bit location includes a domain in the one position when interrogated, is shown as pulse P*o* in FIG. 4. In the absence of a domain in the one position, only a negligible pulse is observed.

For linear select organization, other types of readout techniques are useful. Copending application Ser. No. 579,866, filed Sept. 16, 1966, for A. H. Bobeck, for example, describes one useful technique where domains in the bit location of a selected word of a domain propagation memory are partially compressed to provide readout in a nondestructive mode. The domains expand to a stable shape when the interrogate pulse terminates.

Figure 6:
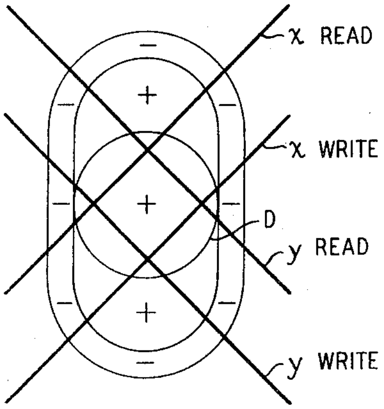
FIGS. 6 and 7 are schematic representations of variations of the arrangement of FIG. 1.

FIG. 6 shows a bit location including three positions arranged in line and, illustratively, encompassed by an annulus-shaped impedance represented by a double oval symbol. The central position, occupied by domain D in the figure corresponds to the one position of FIG. 2A. The lower position, as viewed, corresponds to the zero position of FIG. 3. The upper position may be called a read position. X and Y read conductors intersect between the central and upper positions as shown.

A permanent magnetic pole such as a positive pole of a dipole is fixed centrally in each position of the bit location as shown by the plus signs in FIG. 6. This may be accomplished by the use of three apertures of positively magnetized material in sheet 21 in order to provide attractive forces for a domain in the corresponding positions. The domain wall of domain D will be in a stable position only when it is symmetrically disposed with respect to one of the fixed positive poles.

The write operation is entirely analogous to that of the arrangement of FIGS. 2A and 3. Readout, however, is in response to pulses on the additional X and Y read conductors, shown in FIG. 6, under the control of a control circuit as shown in FIG. 1. The presence of a domain in the central position is detected as that domain moves to the upper position in response to the "read" pulses. Opposite polarity "read" pulses return any domain so moved. If a domain is absent in the central position of a selected domain, of course, no domain is moved for detection. Domains in central positions in partially selected locations are only negligibly shuttled. A sense conductor is coupled to the upper positions of each bit location, conveniently in the manner of FIG. 5, to this end.

No constrictions in the annulus arrangement of apertures are necessary in the embodiment of FIG. 6. The fixed positive poles provide the necessary impedance instead.

Figure 7:
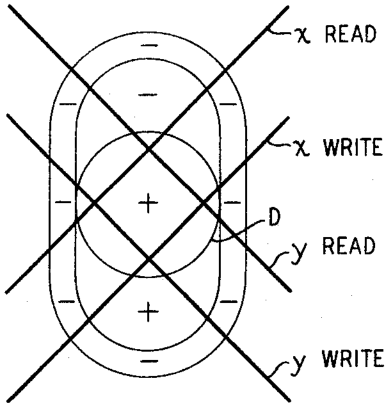

FIG. 7 shows an embodiment wherein the pulses necessary to return a domain to a central position as described in connection with FIG. 6 are unnecessary. The only difference between the embodiments of FIGS. 6 and 7 is that the upper position to which a domain is moved during a readout operation includes a sufficient negative pole distribution to provide repulsion forces to render that position unstable for domains. Such a distribution is represented by a negative sign in FIG. 7.

The various embodiments described include an illustratively insurmountable boundary to domain wall motion encompassing each bit location for a domain and including surmountable boundaries between the positions of a bit location. The insurmountable boundaries are provided, illustratively, by the magnet material in the apertures of an annulus as described and are indicated by the double oval in each of FIGS. 6 and 7. The surmountable boundaries may be provided by fixed centrally located like (attracting) poles or, alternatively, by symmetrically disposed unlike (repelling) poles to constrict the channel of propagation. The arrangement of FIGS. 2A and 3 illustrates the latter; the arrangements of FIGS. 6 and 7 illustrate the former. In each instance, drive conductors divide (i.e., intersect at) the various positions in a bit location and, conveniently, a domain in a position is of a size to overlap the drive conductors as shown for example in FIG. 7.

There are a variety of techniques for providing an impedance to a domain motion in accordance with this invention. The various embodiments have been described in terms of a nonmagnetic layer in which apertures are filled with magnetic material. The magnetic material is poled to repel single wall domains in some embodiments and to attract those domains in others. All that is necessary is that spatially varying or nonuniform fields be encountered by a domain when it is moved from one position to another. An apertured magnetic sheet, adjacent the sheet in which domains are moved, may be used to propertly distort a uniform bias field to this end or, alternatively, to provide the requisite spatially varying fields in the absence of a uniform bias. These arrangements and many others are discussed in copending application Ser. No. 674,832, filed Oct. 13, 1967, for A. H. Bobeck, W. J. Tabor and A. A. Thiele. In addition, wiring loops of a constricted-annulus shape may be employed to generate appropriate fields when a current is applied to it.

Experiments carried out with apertured transparent layers permit operation in accordance with this invention to be observed optically (Faraday effect) in a most convenient manner. In one specific example, a 30 mil sheet of sapphire has 2 mil holes on 3 mil centers drilled through it. The holes are filled with ferric oxide and the ferric oxide is magnetized in a direction opposite to the magnetization of domains in an adjacent sheet of thulium orthoferrite in the manner of FIG. 2B. The domains are about 3 mils in diameter. The apertures are arranged essentially as shown in FIGS. 2A and 3. A 100 milliampere pulse applied to each of the selected X and Y conductors moves a domain in only a selected bit location while leaving domains in partially selected locations essentially undisturbed.

What has been described is considered only illustrative of the principles of this invention. Consequently, various modifications may be made therein by one skilled in the art without departing from the scope and spirit of this invention.

What is claimed is:

1. A magnetic memory comprising a first sheet of magnetic material, means for defining in said sheet bit locations including first and second positions for single wall domains, propagation means for controllably moving single wall domains from first to second positions in selected bit locations in said sheet, external means for generating a shaped field for providing a threshold to the movement of single wall domains between each of said first positions and the corresponding said second positions, and means for selectively detecting the presence and absence of single wall domains in first positions.

2. A magnetic memory in accordance with claim 1 wherein said first sheet comprises a material substantially isotropic in the plane of said sheet and having a preferred direction of magnetization out of the plane of the sheet.

3. A magnetic memory in accordance with claim 2 wherein said propagation means includes first and second sets of conductors intersecting in pairs between associated first and second of said positions and means for applying to selected ones of said first and second conductors currents of an amplitude each to provide a field in said sheet less than said threshold, said currents generating at only a selected bit location a field in excess of said threshold.

4. A magnetic memory in accordance with claim 3 wherein each of said bit locations includes thereabout a barrier to domain propagation.

5. A magnetic memory in accordance with claim 3 wherein said means for providing a threshold comprises a second sheet of nonmagnetic material including apertures therein, said apertures being positioned centrally with respect to corresponding first and second positions, and magnetic material filling said apertures, said magnetic material being magnetized to attract domains.

6. A magnetic memory in accordance with claim 3 wherein said means for providing a threshold comprises a second sheet of nonmagnetic material including apertures therein, said apertures being positioned astride the propagation path of domains between associated first and second positions in said first sheet, and magnetic material filling said apertures, said magnetic material being magnetized to impede the movement of domains between associated first and second positions.

7. A magnetic memory in accordance with claim 6 wherein said magnetic material is magnetized to repel domains.

8. A magnetic memory comprising a sheet of magnetic material substantially isotropic in the plane of the sheet and having a preferred direction of magnetization out of the plane of the sheet, means for controllably moving single wall domains from first to second positions in bit locations in said sheet, and means for providing at each of said bit locations about corresponding first and second positions in pairs an annulus-shaped magnetic field of a polarity to repel said domains.

9. A magnetic memory in accordance with claim 8 wherein said annulus-shaped field presents an insurmountable barrier to domain motion.

10. A magnetic memory in accordance with claim 8 wherein said annulus-shaped field includes a constriction forming a figure 8 in the plane of said sheet.

11. A magnetic memory in accordance with claim 10 wherein said constriction presents a surmountable barrier to domain motion.

12. A magnetic memory in accordance with claim 8 wherein said bit locations also include third positions and said magnetic fields also encompass corresponding said third positions.

13. A magnetic memory in accordance with claim 12 wherein each of said positions includes means for providing a field for attracting single wall domains.

14. A magnetic memory in accordance with claim 12 wherein each of said first and second positions includes means for attracting single wall domains and said third position includes means for repelling single wall domains.

References Cited

UNITED STATES PATENTS 3,114,898 12/1963 Fuller .............. 340—174

BERNARD KONICK, Primary Examiner

G. M. HOFFMAN, Assistant Examiner